United States Patent
Curtis et al.

(10) Patent No.: US 10,705,880 B2
(45) Date of Patent: Jul. 7, 2020

(54) CLUSTER UPDATING USING TEMPORARY UPDATE-MONITOR POD

(71) Applicant: VMWARE, INC., Palo Alto, CA (US)

(72) Inventors: Tyler Curtis, Shingle Springs, CA (US); Karthigeyan Vijayakumar, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 147 days.

(21) Appl. No.: 15/713,071

(22) Filed: Sep. 22, 2017

(65) Prior Publication Data

US 2019/0095253 A1    Mar. 28, 2019

(51) Int. Cl.
| | | |
|---|---|---|
| G06F 9/50 | (2006.01) | |
| H04L 29/08 | (2006.01) | |
| G06F 8/65 | (2018.01) | |
| H04L 12/26 | (2006.01) | |
| H04L 12/24 | (2006.01) | |
| G06F 8/656 | (2018.01) | |

(52) U.S. Cl.
CPC .............. *G06F 9/5077* (2013.01); *G06F 8/65* (2013.01); *G06F 8/656* (2018.02); *H04L 41/082* (2013.01); *H04L 41/0859* (2013.01); *H04L 41/5054* (2013.01); *H04L 41/5058* (2013.01); *H04L 43/04* (2013.01); *H04L 43/10* (2013.01); *H04L 67/34* (2013.01); *H04L 41/0886* (2013.01); *H04L 41/5009* (2013.01)

(58) Field of Classification Search
CPC ....... G06F 9/5077; G06F 8/65; H04L 41/082; H04L 41/5058; H04L 43/10; H04L 67/34; H04L 41/0886; H04L 41/5009

USPC .......................................................... 709/221
See application file for complete search history.

(56) References Cited

U.S. PATENT DOCUMENTS

| | | | | |
|---|---|---|---|---|
| 9,112,769 | B1 * | 8/2015 | Fitzgerald ............ | H04L 41/0213 |
| 9,760,529 | B1 * | 9/2017 | Ho ........................ | G06F 16/27 |
| 9,928,059 | B1 * | 3/2018 | Sartor .................... | G06F 8/71 |
| 2005/0177827 | A1 * | 8/2005 | Fong ..................... | G06F 9/4492 |
| | | | | 717/171 |
| 2016/0043892 | A1 * | 2/2016 | Hason .................. | H04L 41/046 |
| | | | | 709/223 |
| 2016/0366233 | A1 * | 12/2016 | Le .......................... | H04L 67/16 |

(Continued)

OTHER PUBLICATIONS

Tom Dickman, "How to Upgrade a Kubernetes Cluster With No Downtime", Sep. 19, 2016, https://medium.com/retailmenot-engineering/zero-downtime-kubernetes-cluster-upgrades-aab4cac943d2, 5 pages.

(Continued)

*Primary Examiner* — Backhean Tiv
*Assistant Examiner* — Schquita D Goodwin

(57) ABSTRACT

Multiple instances of a distributed application are run in a Kubernetes cluster. An updated version of the application must undergo some post-launch initialization before a production workload handled by the original version can be switched to the updated version. Accordingly, a temporary update-monitor pod is inserted into the cluster so that it can query the application as to its update status and report it to a log file. A script external to the cluster can read the log file to determine if initialization is complete. If so, the workload can be switched to the update instance. The temporary update-monitor pod is destroyed to free up resources and to ensure that it is does not pose a security vulnerability.

2 Claims, 3 Drawing Sheets

(56) References Cited

U.S. PATENT DOCUMENTS

| | | | |
|---|---|---|---|
| 2017/0111241 A1* | 4/2017 | Degioanni | H04L 41/5058 |
| 2017/0262221 A1* | 9/2017 | Zhao | G06F 3/0647 |
| 2018/0109387 A1* | 4/2018 | Vyas | H04L 9/3247 |
| 2018/0152534 A1* | 5/2018 | Kristiansson | H04L 67/16 |
| 2018/0288129 A1* | 10/2018 | Joshi | H04L 43/08 |
| 2018/0359338 A1* | 12/2018 | Vyas | H04L 67/10 |
| 2019/0095293 A1* | 3/2019 | Zhang | G06F 11/2082 |

OTHER PUBLICATIONS

Google Cloud Platform, "Upgrading a Container Cluster", Aug. 21, 2017, https://cloud.google.com/container-engine/docs/clusters/upgrade, 4 pages.

* cited by examiner

CLUSTER UPDATING USING TEMPORARY UPDATE-MONITOR POD

BACKGROUND

A "distributed application" is an application for which a processing workload is shared by plural instances of the application executing in parallel. The instances can include instances of different software application programs and/or multiple instances of a given software application program. The instances can run on different hardware, so that if one instance fails due to a fault in the underlying hardware, other instances can assume its portion of the workload. The instances may operate independently of each other, or they may cooperate with each other. In the latter case, the instances may be required to communicate with each other, e.g., to synchronize data they are collecting and/or generating.

The application instances can be arranged in pods of a Kubernetes cluster, wherein each pod can hold one or more application instances. Application instances in a Kubernetes cluster can easily communicate with other application instances in the cluster, e.g., to synchronize data, while communication with entities outside the cluster can be controlled, e.g., for security purposes.

DETAILED DESCRIPTION

Figure 1:
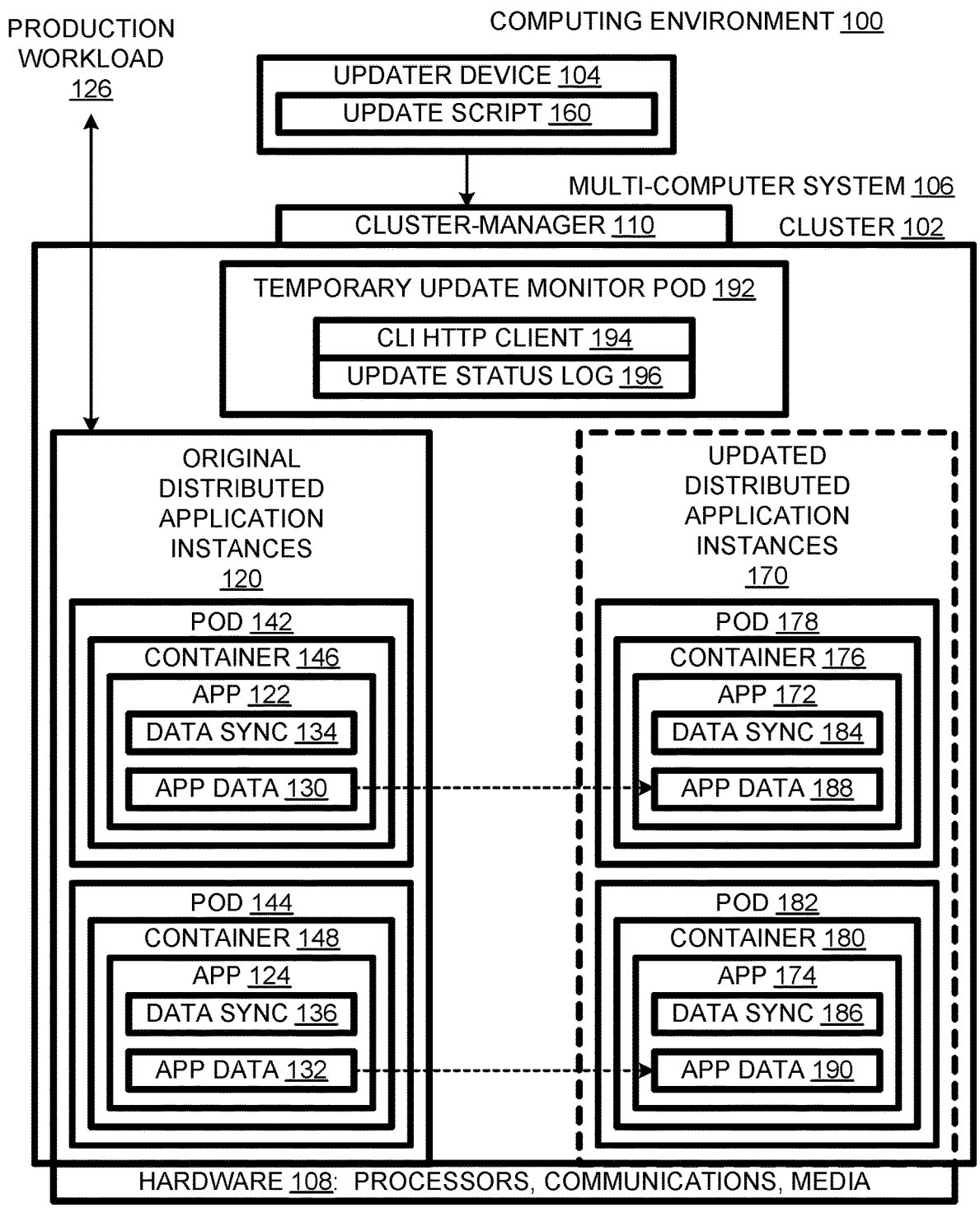
FIG. 1 is a schematic diagram of a computing environment including a distributed application to be updated.

The present invention provides for using a temporary update-monitor pod in a cluster to detect completion of post-launch initialization of an update to a distributed application executing in a cluster. Herein, a pod is a unit that can be controlled by a cluster and that can host one or more application instances. The cluster can, for example, be a Kubernetes cluster. Herein, "update" encompasses replacing an application instance with another application instance, e.g., to upgrade or to downgrade an application.

Updating a distributed application can involve updating each instance of one or more of its application programs. Less than all instances may be updated: for example, it may be that only one tier of a multi-tier distributed application is to be updated. In some cases, once all updated instances are launched and executing, a production workload can be switched from the original (pre-update) versions to the updated versions. In other cases, some post-launch initialization is required before the workload can be switched. For example, it may be necessary to transfer data generated and collected by the original instances to the updated instances before the updated instances can assume the workload.

In the course of the present invention, a problem was recognized in updating a distributed application requiring a post-launch initialization in a Kubernetes context. While a Kubernetes cluster is designed to detect and report when a launched application is ready to run, a Kubernetes cluster may not be designed to detect and report completion of a post-launch initialization. This presents a challenge to an external (to the cluster) entity managing the update and wanting to switch the workload once post-launch initialization is complete.

While it is possible to allow an external script access to cluster pods and/or the application instances they host, such an arrangement could introduce unacceptable security issues. To avoid these issues, the present invention creates a temporary pod within the cluster that can communicate with the pods hosting application instances to determine the status of post-launch initialization. The temporary pod's existence can be limited to a number of seconds, after which the resources it consumed are freed for other uses and any security issues it raised are eliminated.

In accordance with the present invention, an external script or other entity can use a Kubernetes API to command a Kubernetes manager to create a temporary update-monitoring pod, e.g., a lightweight http (Hypertext Transfer Protocol) client via a command-line interface (CLI) to communicate with other pods (e.g., those holding application instances) to be updated. The Kubernetes manager is not in the cluster, but can communicate with each of the pods in the cluster. The Kubernetes manager can be accessed via its API, without exposing the application instances in the cluster to additional security risks.

The temporary pod can send http requests to initiate post-launch processing, monitor the status of initialization and report the returned results in a log, which can be accessed by the external entity. Once the log has been read by the external entity, the temporary pod can be destroyed, freeing resources and eliminating it as a possible security vulnerability. Note that while the foregoing describes the invention in terms of Kubernetes clusters and pods, the invention can apply to clusters other than Kubernetes and to included application-instance hosts other than pods.

As shown in FIG. 1, a computing environment 100 includes a Kubernetes cluster 102 and a updater device 104 for managing cluster 102 via a cluster manager 110. Kubernetes is an open-source system for automating deployment, scaling and management of containerized applications that can host process containers, e.g., Docker containers (promoted by Docker, Inc.). Cluster 102 runs on a multi-machine computer system 106 including hardware 108, e.g., processors, communications devices, and non-transitory media. The non-transitory media is encoded with code that, when executed by the processors, defines cluster 102.

Cluster 102 contains instances 120 of an original version of a distributed application, in this case, a cloud-management application that is itself hosted in a public cloud. Instances 120 are running on respective pods 142 and 144. More generally, there can be any number of original distributed application instances running on pods. Pods 142 and 144 are running "original" instances in that they are to be updated, in other words, replaced by updated versions of the distributed application.

Original distributed application instances 120 handle respective streams of a production workload 126. In the course of handling this workload, original distributed application instances 120 produce and update respective sets app data 130 and 132. Each instance 122, 124 includes a respective data synchronizer 134, 136 so that the application instances will have the same set of data. That way, if one of the instances fails, little or no data will be lost, as the other instance will have a complete set.

Figure 2:
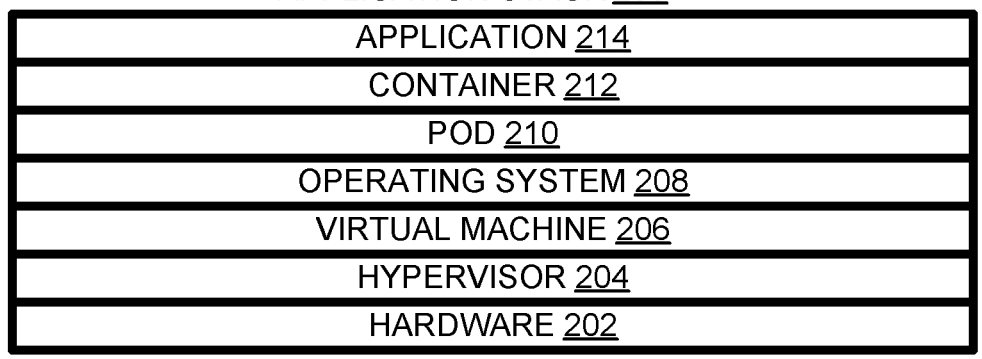
FIG. 2 is a schematic diagram of an application stack applicable to application instances represented in FIG. 1.

Applications are arranged in pods within a cluster. In the illustrated case, there is a cluster-manager 110 (that runs on a "master" node that is separate from the "minion" nodes on which the pods run) for managing cluster 102, and minion nodes for containing applications and their containers. Thus, application instance 122 is in pod 142 and application instance 124 is in pod 144. More generally, each pod can hold one or more containers, each of which typically is running an instance of a specific version of an application. Thus, as represented in FIG. 2, each application stack 200 would include hardware 202, a hypervisor 204 for supporting virtual machines, a virtual machine 206, a guest operating system 208, a pod 210, e.g., Docker, a container 212, and an application 214.

Correspondingly, application instance 122, FIG. 1, is contained in a process container 146 within pod 142, while application instance 124 is contained in a process container 148 within pod 144. Application instances 122 and 124 include respective data synchronizers 150 and 152 for synchronizing application data 130 with application data 132. Application instances 122 and 124 are running the same version (e.g., based on the same Docker image) of the original distributed application 120.

Updater device 104, FIG. 1, can be any form of computer, e.g., a laptop, tablet, or a smartphone. Updater device 104 includes a script 160 designed to, when executed by updater device 104, cause cluster 102 to be updated. More specifically, update script 160, when executed, can send commands to cluster-manager 110 that can create a new (and separate) version of the distributed application instances 170 to be created, and to initiate migration of all application data associated with instance 120.

During an update, original application instance 122 is updated to and replaced by updated application instance 172. Likewise, original application instance 124 is updated to and replaced by an updated application instance 174. More generally, there does not have to be a 1:1 relationship between original instances and updated instances. For example, original instance 122 could be updated and the update cloned to yield plural updated instances. After the update, the number of instances could increase, decrease, or stay the same. However, since different original instances may be running on different systems, it may be most efficient to update each node by replacing the original instance that it was running with an updated instance.

In the illustrated example, updated distributed application instances 170 include application instances 172 and 174. Updated application instance 172 resides in a process container 176 of a pod 178, while updated application instance 174 resides in a process container 180 of a pod 182. Updated application instance 172 includes a data synchronizer 184, and updated application instance 174 includes a data synchronizer 186. However, upon launch of application instances 172 and 174, the respective application data sets 188 and 190 are initially empty.

In the illustrated embodiment, a completely new a separate version of an application replaces its predecessor. In some alternative embodiments, updating the application instances can involve cloning their container images, apply updates to the clones, and then launching the updated clones. In many cases, once the updated application instances are all launched, production can be switched from the original instances to the updated instances.

However, upon launch, updated distributed application instances 172 and 174 lack the application data collected and generated by the original distribution application instances 122 and 124. For this reason, the updated application instances 172 and 174 are not ready to handle production workloads upon launch. Therefore, the production workload cannot be switched in response to an indication that the updated distribution application instances 172 and 174 have been launched.

Instead, original distribution application instances 120 continue to handle production workloads while application data is transferred to the updated instances. For example, application instances 122 and 124 can synchronize with each other and the updated application instances until all four (original and updated) app data instances are synchronized. At that point In an alternative embodiment, the app data from the original distributed application instances can be checkpointed, e.g., their respective app data can be transferred to the respective updated application instances. In such a case, production workloads can be switched to the updated application instances on a staggered basis.

Once the data has been transferred, the updated application instances are ready to handle production workloads. However, cluster 102 prevents entities outside of the cluster (e.g., update script 160) from querying pods directly to determine when the data transfer is complete. It would be possible to provide external access to the pods, but this external access might pose a security risk.

So, instead, update script 160 authenticates itself to cluster-manager 110 and commands it, via an API of cluster manager, to create a temporary update-monitor pod 192 within cluster 102. The temporary update-monitor pod can include a lightweight http client 194 that uses a command-line interface (CLI) to communicate with other pods of cluster 102. As this pod 192 is internal to the cluster 102, it can locate and communicate with other pods in the cluster. It can thus poll the original and updated application instances at a specified time to determine if the application data transfer is complete. The results of the polling can be entered into an update status log 196, which can be read by external script 160. If update status log 196 indicates that the transfer has been successfully completed, then production transactions can be switched to the updated instances. The script 160 can also command the cluster 110 pod 162 to destroy the original distributed application instances and the temporary update-monitor pod to free up resources and remove any security risk that it might represent if allowed to persist.

Instead of indicating a success, the update status log 196 can indicate that the transferred failed, e.g., one of the pods involved in the transfer indicates that it could not complete the transfer, or that there was a time-out, e.g., a status query was not answered. In either of these cases, the temporary pod can be destroyed and, if appropriate, the script can command cluster manager 110 to create a new temporary update-monitor pod. Because creation of the temporary pod requires authentication and because the lifetime of the temporary pod is limited, e.g., less than a minute, it poses little or no security risk.

Figure 3:
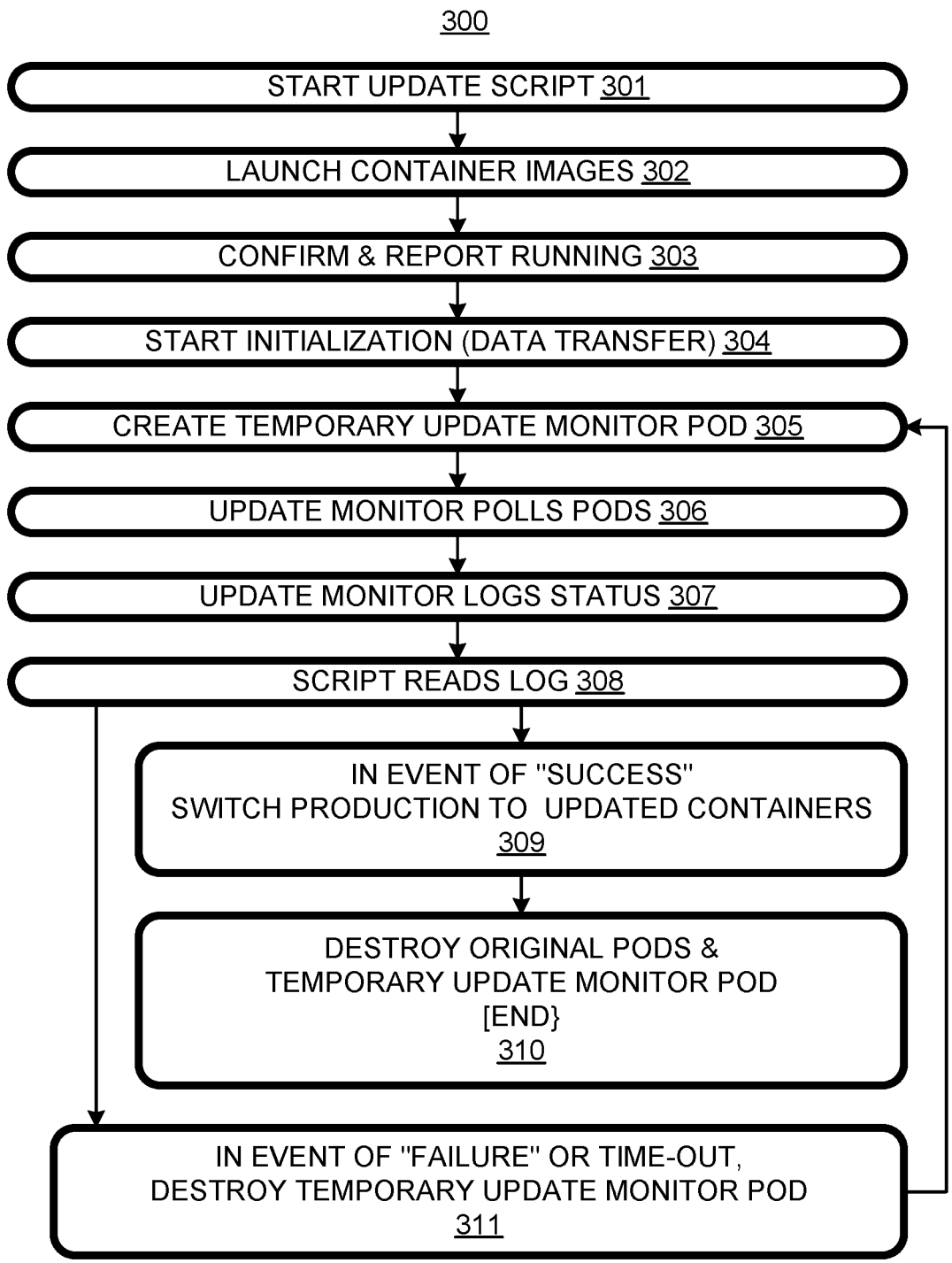
FIG. 3 is a flow chart of an update process for a cluster of distributed application instances.

A process 300 for updating a distributed application in a cluster is flow charted in FIG. 3. At 301, an update script is launched outside the cluster. At 302, the script causes updated instances of the distributed application to be launched. In some cases, preparation for the launch can included cloning container images for the original instances, applying updates to the cloned images, and launching the updated cloned images. Once the launches have completed and the updated instances are up and running, e.g., in new pods within the cluster, the cluster can report, at 303, to the script that the new version has been successfully created and is running. At this point, at 304, post-launch initialization, e.g., data transfer from the original instances to the updated instances, can begin.

At 305, the script commands a cluster manager to create a temporary update-monitor pod. The temporary update-monitor pod includes a lightweight web (http) client that sends, at 306, http commands to the other pods in the cluster to initiate and monitor the status of the data transfer. In other words, the temporary update-monitor pod polls the other pods in the cluster. The HTTP responses are written to a log file at 307. The script waits for the update-monitor pod to complete and then reads the log at 308. In this way, the script can obtain information regarding the data transfer via the temporary update-monitor pod that it could not obtain directly on its own.

In the event that the log file indicates that the data transfer is complete and that the update operation is a success, then, at 309, the script causes the production workflow to be switched from the original distributed application instances to the updated distributed application instances. Once the switch-over is complete, the script commands, at 310, the cluster manager to destroy the original pods (containing the original application instances) and the temporary update-monitor pod. This marks an end to update process 300.

In the event that the log indicates that the updated failed, e.g., because some pod indicates that it cannot complete the transfer, or, in the event a time-out occurs in that the poll by the temporary pod goes unanswered, then, at 311, the script commands the cluster manager to destroy the temporary update-monitor pod and the resources associated with the new (failed) application version so that it does not persist. Process 300 then can return to 305, to create a new temporary update-monitor pod. In this way, no temporary update-monitor pod can be too transitory to expose a security risk. For example, the timing can be such that each temporary update-monitor pod persists for less than a minute.

All art labeled "prior art", if any, is admitted prior art; all art not labeled "prior art" is not admitted prior art. The illustrated embodiments, as well as variations thereon and modifications thereto, are provided for by the present invention, the scope of which is defined by the following claims.

What is claimed is:

1. A process comprising:
while an original instance of an application is executing in a cluster, launching an updated instance of the application in the cluster, wherein said cluster is not inherently designed to detect and report completion of a post-launch initialization;
commanding, by an entity external to the cluster, a cluster manager node to create a temporary update monitor node in the cluster, said temporary update monitor node limited to operate and exist for a limited time duration;
once the launch of the updated instance of the application in the cluster is complete and the updated instance of the application in the cluster is executing, starting a post-launch initialization;
during the post-launch initialization, using the temporary update monitor node to monitor an initialization status of the updated instance of the application in the cluster;
writing, by the temporary update monitor node, an initialization status to a log file;
reading, by the entity external to the cluster, the initialization status from the log file;
destroying the temporary update monitor node;
provided the initialization status indicates the initialization is complete, switching a production workload from the original instance of the application executing in the cluster to the updated instance of the application in the cluster;
the application is running in cluster node containers, and the cluster node container are arranged pods;
wherein, provided the initialization status indicates that initialization has failed, destroying the temporary update monitor node, and commanding the cluster manager node to create a new temporary update monitor node to monitor initialization status of the update instance of the application in the cluster; and
wherein, provided the initialization status indicates that no response was received to a query regarding initialization status, destroying the temporary update monitor node, and commanding the cluster manager node to create a new temporary update monitor node to monitor initialization status of the updated instance of the application in the cluster, wherein said destroying of said temporary update monitor node frees resources consumed by said temporary update monitor node and eliminates security issues associated with said temporary update monitor node.

2. A system comprising non-transitory media encoded with code that, when executed by a processor, implements a process including:
while an original instance of an application is executing in a cluster, launching an updated instance of the application in the cluster, wherein said cluster is not inherently designed to detect and report completion of a post-launch initialization;
commanding, by an entity external to the cluster, a cluster manager node to create a temporary update monitor node in the cluster, said temporary update monitor node limited to operate and exist for a limited time duration;
once the launch of the updated instance of the application in the cluster is complete and the updated instance of the application in the cluster is executing, starting a post-launch initialization;
during the post-launch initialization, using the temporary update monitor node to monitor an initialization status of the updated instance of the application in the cluster;
writing, by the temporary update monitor node, an initialization status to a log file;
determining, by the entity external to the cluster, the initialization status from the log file;
destroying the temporary update monitor node;
provided the initialization status indicates that the initialization is complete, switching a production workload from the original instance of the application executing in the cluster to the updated instance of the application in the cluster;
the application is running in cluster node containers, and the cluster node container are arranged in pods;
wherein, provided the initialization status indicates that initialization has failed, destroying the temporary update monitor node, and commanding the cluster manager node to create a new temporary update monitor node to monitor initialization status of the updated instance of the application in the cluster; and
wherein, provided the initialization status indicates that no response was received to a query regarding initialization status, destroying the temporary update monitor node, and commanding the cluster manager node to create a new temporary update monitor node to monitor initialization status of the updated instance of the application in the cluster, wherein said destroying of said temporary update monitor node frees resources consumed by said temporary update monitor node and eliminates security issues associated with said temporary update monitor node.

\* \* \* \* \*